Patented Aug. 17, 1948

2,447,044

UNITED STATES PATENT OFFICE 2,447,044

DIPHENYLAMINE MANUFACTURE

Alfred B. Wester, Lawton A. Burrows, and Winford B. Johnson, Woodbury, N. J., assignors to E. I. du Pont de Nemours & Company, Wilmington, Del., a corporation of Delaware No Drawing. Application April 26, 1944, Serial No. 532,882

3 Claims. (Cl. 260—576)

This invention relates to an improved method for the production of diarylamines and more particularly to such a method for the manufacture of diphenylamine, in which conversion efficiency and speed are greatly increased and corrosive action is reduced.

Diphenylamine and other diarylamines have been prepared in the past by the condensation of aniline in the presence of suitable catalysts. These have included particularly aniline hydrochloride and other halides which liberate a hydrogen halide at the elevated temperatures at which reaction takes place, for example, ammonium chloride. Such methods have been used successfully in the production of diphenylamine but have been accompanied by several serious disadvantages. The commercial processes have been carried out in iron autoclaves and considerable corrosion of the ferrous metal has resulted, so that the effective lives of the autoclaves and cast iron liners have been unduly shortened. A further disadvantage, which has been accepted as a necessary evil, has been the long time of heating the contents of the autoclaves in order to obtain satisfactory conversions. This has caused an undesirable limitation on plant capacity.

An object of the present invention is an improved method for the production of diarylamines based on the employment of a highly efficient catalyst. A further object is a method for the preparation of diphenylamine in which markedly accelerated conversions of aniline to diphenylamine result from the use of this catalyst. A still further object is such a method carried out in iron autoclaves in which corrosion of the ferrous metal is greatly reduced. Additional objects will be disclosed as the invention is described more in detail in the following.

The present invention accomplishes the foregoing objects and overcomes the disadvantages of the prior art methods by bringing about the conversion of aniline to diphenylamine in the presence of ferric chloride in catalytic amounts, for example, in an amount between 0.3% and 8.0% by weight of the aniline used.

The following examples will serve as specific embodiments of methods of carrying out the invention.

Example I

In a small scale experiment, 612 grams of aniline and 27.2 grams of ferric chloride were introduced into a small autoclave. While the hydrated salt was used, the amount stated is given on the dry basis. The pressure was raised to 350 pounds per square inch by use of nitrogen and the temperature was raised to 316° C. Heating at this temperature was continued for 20 hours. At the end of that period, the charge was removed from the autoclave and the diphenylamine separated. This amount to 262 grams, 47% of the theoretical conversion value.

Using one-fourth the above amount of ferric chloride, 6.8 grams, a conversion of 41% was obtained; and with 3.4 grams, 34%. The quantities of catalyst cited above amount respectively to approximately 4.4%, 1.1%, and 0.55% of the aniline used. The conversions obtained were notably higher than were obtained in similar trials with prior art catalysts, ammonium chloride for example, 47% against 25% with 4.4% of catalyst, and 34% against 21% with .55% catalyst. The activity of the ferric chloride catalyst is shown particularly by the excellent conversions obtained when small amounts were present during the reaction.

Example II

Aniline in the amount of 125 pounds and 3.55 pounds of anhydrous ferric chloride were introduced into a 30-gallon autoclave and heated until a constant pressure of 160 pounds per square inch was reached. After 8 hours of heating, the amount of diphenylamine produced was 66.7 pounds, a conversion equal to 58.8% of theory. The activity of the ferric chloride catalyst is evidenced by the fact that with prior art catalysts a heating period of over 24 hours would have been required for a similar conversion. Even after two hours' heating in the present trial, a conversion of over 24% had taken place. The catalyst amounted to approximately 2.85% by weight of the aniline used.

In an additional run using the same quantity of aniline and the same pressure conditions but with 1.97 pounds of ferric chloride as catalyst (1.57% of the aniline by weight), 47.4 pounds of diphenylamine was obtained after 5 hours of heating, a conversion of 41.7% of theory.

In another similar run 125 pounds of aniline and 3.55 pounds of ferric chloride were introduced into the same autoclave, and the pressure was maintained at 200 pounds per square inch for 4½ hours of heating. At the end of this period, the amount of diphenylamine produced was 65 pounds, a conversion of 57.3% of theoretical.

Example III

Aniline in the amount of 4500 pounds and 100 pounds of ferric chloride were introduced into a cast iron autoclave. The contents were heated until a pressure of 160 pounds per square inch was reached, which was maintained for six hours. The conversion of aniline to diphenylamine amounted to approximately 38.5% of theoretical. To obtain a similar conversion with the prior art catalysts would have required between two and three times as long a heating period at the same elevated temperature and pressure. Normal yields were likewise obtained.

The experimental data included in the foregoing examples show that ferric chloride is a catalyst of unusual activity, both in the degree of conversion effected and more particularly in the speed with which it is initiated. An advantage of equal importance is the effect of this catalyst in retarding the corrosion of the metal of the cast iron autoclaves in which the reactions are carried out. This was determined by the insertion into an autoclave, during a run, of test pieces of cast iron of known weight and dimensions. Such test pieces were placed within the autoclave in glass containers where they were exposed on all sides to the action of the solid catalyst. When the ferric chloride catalyst was used, the corrosion amounted to about .157 inches penetration per month against a determined value of .678 inches penetration when an ammonium chloride-ferrous chloride catalyst was used.

The catalytic process according to our invention will be carried out at elevated temperatures and pressures. Desirably the autoclave mixture will be at boiling and refluxing temperature, and a pressure will ordinarily be used between 100 and 300 pounds per square inch when employing a batch process. We do not intend to be limited, however, to these pressures and may use much higher pressures if a continuous process is followed. Under such conditions, the mixture will doubtless not be at boiling temperature.

In the examples cited, ferric chloride was used by itself as a catalyst, and it is very effective when so used. We may, however, prefer to employ it in combination with another catalytic material, for example, a second metal halide or an ammonium halide, preferably one that does not liberate hydrochloric acid, for example, ammonium bromide or ammonium iodide.

It is known that halides have been used as catalysts for the production of diphenylamine in the past. Ferric chloride, however, is outstanding in its superiority to those previously employed, both in its activity as a catalyst and in its relatively small amount of corrosive effect on the ferrous metals present. We find it desirable to employ it in amounts between 0.3% and 8.0% by weight of the aniline present. Large amounts of ferric chloride are unsuitable and inefficient.

When a quantity equal to about 29% of the aniline was used, for example, charring of the charge took place, discharge of the autoclave contents was impeded, and low yields were obtained. Our preferred limits of catalyst are between 0.5% and 3.0%.

While the examples in this case have been drawn particularly to the production of diphenylamine, we intend the invention to be applied also to other diarylamines, where these are prepared from the corresponding primary aromatic amine, for example, to the production of ditolylamines, phenylnaphthylamines, dinaphthylamines, and the like.

We have described our invention at length in the foregoing. It will be understood, however, that many variations may be introduced in the details of procedures and operating conditions without departure from the scope of the invention. We intend to be limited only by the following patent claims:

We claim:

1. The process of producing diphenylamine which comprises heating aniline at an elevated temperature and under superatmospheric pressure in the presence of ferric chloride in an amount between 0.3 and 8.0% by weight of the aniline used.

2. The process of producing diphenylamine which comprises heating aniline at reaction temperature and at a pressure above 100 pounds per square inch in the presence of ferric chloride in the amount of 0.3% to 8.0% by weight of the aniline.

3. The process of producing diphenylamine which comprises heating aniline at boiling temperature and under a pressure of between 100 and 300 pounds per square inch in the presence of ferric chloride in the amount of 0.3% to 8.0% by weight of the aniline.

ALFRED B. WESTER.
LAWTON A. BURROWS.
WINFORD B. JOHNSON.

REFERENCES CITED

The following references are of record in the file of this patent:

UNITED STATES PATENTS

| Number | Name | Date |
|---|---|---|
| 1,212,928 | Flurscheim | Jan. 16, 1917 |
| 1,549,136 | Lachman | Aug. 11, 1925 |

FOREIGN PATENTS

| Number | Country | Date |
|---|---|---|
| 717,538 | France | Jan. 9, 1932 |
| 138,372 | Great Britain | Feb. 19, 1920 |